US010439984B2

(12) United States Patent
Jarraya et al.

(10) Patent No.: US 10,439,984 B2
(45) Date of Patent: Oct. 8, 2019

(54) MULTI-STAGE DEFENSE-AWARE SECURITY MODULES PLACEMENT IN THE CLOUD

(71) Applicant: Telefonaktiebolaget LM Ericsson (publ), Stockholm (SE)

(72) Inventors: Yosr Jarraya, Montreal (CA); Alireza Shameli-Sendi, Montreal (CA); Mohamed Fekih-Ahmed, Montreal (CA); Makan Pourzandi, Montreal (CA); Mohamed Cheriet, Montreal (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 139 days.

(21) Appl. No.: 15/551,313

(22) PCT Filed: Feb. 20, 2015

(86) PCT No.: PCT/IB2015/051315
§ 371 (c)(1),
(2) Date: Aug. 16, 2017

(87) PCT Pub. No.: WO2016/132181
PCT Pub. Date: Aug. 25, 2016

(65) Prior Publication Data
US 2018/0034774 A1 Feb. 1, 2018

Related U.S. Application Data

(60) Provisional application No. 62/116,641, filed on Feb. 16, 2015.

(51) Int. Cl.
*H04L 29/06* (2006.01)
*H04L 12/24* (2006.01)

(52) U.S. Cl.
CPC .......... *H04L 63/0218* (2013.01); *H04L 41/28* (2013.01); *H04L 63/0236* (2013.01);
(Continued)

(58) Field of Classification Search
CPC ..... H04L 63/20; H04L 63/0236; H04L 63/14; H04L 63/1408; H04L 63/10; H04L 63/105
See application file for complete search history.

(56) References Cited

U.S. PATENT DOCUMENTS 7,000,006 B1 * 2/2006 Chen .................. H04L 63/0263
370/252
7,937,438 B1 5/2011 Miller et al.
(Continued)

FOREIGN PATENT DOCUMENTS

WO 2010014104 A1 2/2010

OTHER PUBLICATIONS

Debashis Basak et al., Virtualizing Networking and Security in the Cloud, Dec. 2010, ACM, vol. 44 Issue 4, pp. 86-94.*
(Continued)

*Primary Examiner* — Luu T Pham
*Assistant Examiner* — Fahimeh Mohammadi
(74) *Attorney, Agent, or Firm* — Coats & Bennett, PLLC

(57) ABSTRACT

Providing security for one or more network flows may include a security deployment node decomposing one or more virtual security appliances (265) of a logical security architecture (255) into security modules (310). The security deployment node orders the security modules (310) into a sequence (320) that implements a selected workflow pattern (400). The selected workflow pattern (400) may be selected from a workflow pattern database, and may define the security to be provided for a flow, for example, according to known best practices. The sequence (320) is then divided
(Continued)

into segments (330), and the segments (330) are assigned to different groups (220) of network nodes (230) in a network (200). For each segment (330), an assignment of each security module (310) in the segment (330) to a network node (230) within the group (220) to which the segment (330) is assigned is computed. The network (200) is then configured according to the assignments.

15 Claims, 13 Drawing Sheets

(52) U.S. Cl.
CPC .......... *H04L 63/1416* (2013.01); *H04L 63/20* (2013.01); *H04L 41/12* (2013.01)

(56) References Cited

U.S. PATENT DOCUMENTS

| | | | | |
|---|---|---|---|---|
| 8,353,031 | B1* | 1/2013 | Rajan | H04L 63/0209 726/22 |
| 2005/0038909 | A1* | 2/2005 | Yoshiba | H04L 12/1886 709/241 |
| 2008/0163357 | A1* | 7/2008 | Xiao | H04L 63/0218 726/15 |
| 2010/0246443 | A1* | 9/2010 | Cohn | H04L 12/4641 370/255 |
| 2011/0029882 | A1* | 2/2011 | Jaisinghani | H04L 41/12 715/736 |
| 2011/0258257 | A1* | 10/2011 | Previdi | H04L 45/126 709/205 |
| 2013/0263143 | A1* | 10/2013 | Kiyoumi | G06F 9/461 718/102 |
| 2014/0115578 | A1* | 4/2014 | Cooper | G06F 21/606 718/1 |
| 2014/0310388 | A1* | 10/2014 | Djukic | H04L 41/0816 709/221 |
| 2015/0312124 | A1* | 10/2015 | Curtin | G06F 16/00 709/224 |

OTHER PUBLICATIONS

Yoshihisa Abe et al., vTube: Efficient Streaming of Virtual Appliances Over Last-Mile Networks, Oct. 1-3, 2013, ACM, pp. 1-16.*
Amani S. Ibrahim et al., CloudSec: A Security Monitoring Appliance for Virtual Machines in the IaaS Cloud Model, Oct. 27, 2011, IEEE, pp. 113-120.*
Kai-Oliver Detken et al., Design and Implementation of Virtual Security Appliances (VSA) for SME, Nov. 14, 2013, IEEE, pp. 30-35.*
Shameli-Sendi, A. et al., "Optimal Placement of Sequentially Ordered Virtual Security Appliances in the Cloud", 2015 IFIP/IEEE International Symposium on Integrated Network Management (IM), May 11-15, 2015, pp. 1-5, Ottawa, Canada.
Acharya, H. et al., "Firewall Modules and Modular Firewalls", the 18th IEEE International Conference on Network Protocols, Oct. 5-8, 2010, pp. 174-182.
Palo Alto Networks, "Next-Generation Firewall Security and Advanced Threat Prevention for Your Cloud Computing Deployment", Datasheet—VM Series, 2015, pp. 1-4.
McKeown, N. et al., "OpenFlow: Enabling Innovation in Campus Networks", ACM SIGCOMM Computer Communications Review, Apr. 2008, pp. 69-74, vol. 38, No. 2.
Gutin, G. et al., "Chapter 1: Exponential Neighborhoods and Domination Analysis for the TSP", The Traveling Salesman Problem and Its Variations, 2002, pp. 1-38.
Ravi, R. et al., "Approximation Algorithms for the Traveling Purchaser Problem and Its Variants in Network Design", 7th Annual European Symposium, Jul. 16-18, 1999, pp. 29-40.

Mansini, R. et al., "The traveling purchaser problem with budget constraint", Computers & Operations Research, 2009, pp. 2263-2274, vol. 36.
Ren, K. et al., "Security Challenges for the Public Cloud", View from the Cloud, Jan.-Feb. 2012, pp. 69-73, IEEE Computer Society.
Joseph, D. et al., "Policy-aware Switching Layer for Data Centers", Technical Report No. UCB/EECS-2008-82, Jun. 24, 2008, pp. 1-24.
Gouveia. L. et al., "Models for a traveling purchaser problem with additional side-constraints", Computers & Operations Research, 2011, pp. 550-558, vol. 38.
Shin, S. et al., "FRESCO: Modular Composable Security Services for Software-Defined Networks", ISOC Network and Distributed System Security Symposium, Feb. 2013, pp. 1-16.
Benton, C., "Virtual Firewall Appliances: Trust or Misplaced?", Jan. 24, 2012, pp. 1-6, retrieved on Jan. 13, 2016, retrieved from Internet http://blog.cloudpassage.com/2012/01/24/virtual-firewall-appliances-trust-misplaced/.
Cisco Nexus, "2000 Series Fabric Extenders Data Sheet", pp. 1-25, retrieved on Jan. 13, 2016, retrieved from Internet http://www.cisco.com/c/en/us/products/collateral/switches/nexus-2000-series-fabric-extenders/data_sheet_c78-507093.html.
VMware, "The VMware NSX Network Virtualization Platform, VMware Solutions: Designed for Early and Ongoing Success", Technical White Paper, 2013, pp. 1-13.
Hedlund, B., "What is a Distributed Firewall?", The Network Virtualization Blog, Jul. 9, 2013, pp. 1-9, retrieved on Jan. 13, 2016, retrieved from Internet https://blogs.vmware.com/networkvirtualization/2013/07/what-is-a-distributed-firewall.html.
Zhao, H. et al., "Policy Algebras for Hybrid Firewalls", Annual Conference of ITA (ACITA), 2007, pp. 1-11.
Anderson, J. e tal., "xOMB: Extensible Open Middleboxes with Commodity Servers", Proceedings of the eighth ACM/IEEE symposium on Architectures for networking and communications systems, Oct. 29-30, 2012, pp. 49-60, Austin, US.
Rajagopalan, S. et al., "Split/Merge: System Support for Elastic Execution in Virtual Middleboxes", 10th USENIX Symposium on Networked Systems Design and Implementation, 2013, pp. 227-240.
Aschenbruck, N. et al., "A Security Architecture and Modular Intrusion Detection System for WSNs", Ninth International Conference on Networked Sensing Systems (INSS), Jun. 11-14, 2012, pp. 1-8, Antwerp, Belgium.
Giacinto, G., et al., "A Modular Multiple Classifier System for the Detection of Intrusions in Computer Networks", Proceedings of the 4th international conference on Multiple classifier systems, Jun. 11-13, 2003, pp. 346-355, Guildford, UK.
Zaman, S., "A Collaborative Architecture for Distributed Intrusion Detection System based on Lightweight Modules", IEEE Xplore Conference: Computational Intelligence for Security and Defense Applications, Aug. 2009, pp. 1-131.
Sekar, V. et al., "Network-Wide Deployment of Intrusion Detection and Prevention Systems", 6th International Conference on emerging Networking EXperiments and Technologies (CoNEXT), Nov. 11-Dec. 3, 2010, pp. 1-30, Philadelphia, US.
Goosens, D. et al., "The transportation problem with exclusionary side constraints", Operations Research & Decision Theory, Mar. 2009, pp. 1-11, vol. 7, Issue 1.
Makhorin, A., "GNU Linear Programming Kit Reference Manual", Version 4.38, May 2009, 1-239.
Cisco, "Enhanced Secure Multi-Tenancy Design Guide", Oct. 8, 2010, pp. 1-144, retrieved on Jan. 13, 2016, retrieved from Internet http://www.cisco.com/c/en/us/td/docs/solutions/Enterprise/Data_Center/Virtualization/securecIdg_V2.html.
Qazi, Z. et al., "SIMPLE-fying Middlebox Policy Enforcement Using SDN", Proceedings of the ACM SIGCOMM Conference, Aug. 12-16, 2013, pp. 1-12, Hong Kong, China.
Sekar, V. et al., "Design and Implementation of a Consolidated Middlebox Architecture", 9th USENIX Symposium on Networked Systems Design and Implementation, Apr. 15-27, 2012, pp. 1-14, San Jose, US.
Fayazbakhsh, S. et al., "Enforcing Network-Wide Policies in the Presence of Dynamic Middlebox Actions using FlowTags", 11th

(56) References Cited

OTHER PUBLICATIONS

USENIX Symposium on Networked Systems Design and Implementation, Apr. 2-4, 2014, pp. 533-546, Seattle, US.
Shin, S. et al., "Avant-Guard: Scalable and Vigilant Switch Flow Management in Software-Defined Networks", 20th ACM Conference on Computer and Communications Security, Nov. 4-8, 2013, pp. 1-12, Berlin, Germany.
Bari, M., et al., "Data Center Network Virtualization: A Survey", IEEE Communications Surveys & Tutorials, 2013, pp. 909-928, vol. 15, No. 2.
Choi, M. et al., "The Multiple Traveling Purchaser Problem", 40th International Conference on Computers and Industrial Engineering (CIE), Jul. 25-28, 2010, pp. 1-5, Awaji, Japan.
Bianchessi, N. et al., "The Distance Constrained Multiple Vehicle Traveling Purchaser Problem", Working Papers, Department of Economics and Management, University of Brescia, Italy, May 2013, pp. 1-41.
Riera-Ledesma, J. et al., "Solving school bus routing using the multiple vehicle traveling purchaser problem: A branch-and-cut approach", Computers & Operations Research, 2012, pp. 391-404, vol. 39.
Manerba, D. et al., "A Branch-and Cut Algorithm for the Multi-Vehicle Traveling Purchaser Problem with Pairwise Incompatability Constraints", Networks, 2015, pp. 139-154.
Choi, M. et al., "The multiple traveling purchaser problem for maximizing system's reliability with budget constraints", Expert Systems with Applications, 2011, pp. 9848-9853, vol. 38.
Bouet, M. et al., "Cost-based placement of virtualized Deep Packet Inspection functions in SDN", IEEE Military Communications Conference, 2013, pp. 992-997.

* cited by examiner

NETWORK TOPOLOGY 270

| NODE RESOURCES | | LINK RESOURCES | |
|---|---|---|---|
| NN 1 | 300 MB | NN 1-NN 1 | 10 MS |
| NN 2 | 100 MB | NN 2-NN 3 | 20 MS |
| NN 3 | 500 MB | NN 2-NN 4 | 40 MS |
| NN 4 | 150 MB | NN 3-NN 5 | 25 MS |
| ... | | ... | |

COST MODEL 275

| NODE PLACEMENT | RESOURCE REQ. |
|---|---|
| SM 1 – NN 1 | 1500 MB |
| SM 1 – NN 2 | 1750 MB |
| SM 1 – NN 3 | 1250 MB |
| SM 1 – NN 4 | 800 MB |
| SM 1 – NN 5 | 2000 MB |
| SM 2 – NN 1 | 300 MB |
| SM 2 – NN 2 | 1000 MB |
| ... | ... |

*FIG. 5*

MULTI-STAGE DEFENSE-AWARE SECURITY MODULES PLACEMENT IN THE CLOUD

TECHNICAL FIELD

The present disclosure relates to providing security for one or more network flows, and more particularly to distributing security functions throughout the network in order to efficiently protect the flows between virtual machines participating in a cloud infrastructure.

BACKGROUND

With the rise of cloud computing, computer networks have become quite complex. Many networks are distributed across numerous sites and geographies, and often involve thousands of network nodes, including various end-user devices, switches, routers, servers, gateways, and firewalls. These networks are often relied upon to reliably and securely transport myriad flows of data traffic from source nodes to destination nodes within the network simultaneously. Many of these flows can involve the transmission of highly sensitive data between network nodes for which security is rigorously enforced. For example, it is not uncommon for financial institutions transacting millions of dollars between accounts to exchange private account data via one or more highly-encrypted traffic flows.

Society's increasing reliance on networks of computers to exchange and process sensitive data has also resulted in an increasing number of malfeasants looking to break into network nodes, or intercept traffic flows, in an attempt to disrupt business operations, or steal private information, for example. The resulting increase in disruptive activity by malfeasants has made network security a paramount concern for network administrators. One approach to network security involves deploying security appliances (e.g., firewalls, Intrusion Detection Systems (IDSs), Intrusion Prevention Systems (IPSs)) within the network. The security appliances typically include a physical network node with sufficient computing resources to support a monolithic, general-purpose, security software solution. A traffic control node, such as a Software Defined Network (SDN) controller, can then configure network nodes to steer flows through these security appliances in order to detect and/or block unwanted traffic.

Although this approach provides security for the network's flows, this approach also creates chokepoints in the network, as flows requiring security will have to be steered to wherever these security appliances are physically located within the network. These chokepoints create single points of failure that can make the network vulnerable to attack or disruption. While these chokepoints can be alleviated by deploying additional security appliances at additional locations throughout the network, this solution does not scale well, as each security appliance requires some minimum computing resources in order to execute a full instance of the security software solution. Thus, network administrators often have to sacrifice substantial amounts of the network's computing resources in order to support the additional deployments. In addition, because reducing the chokepoints also reduces the load per security appliance, each security appliance is often over-protected and under-utilized.

SUMMARY

Embodiments of the present disclosure generally relate to providing security for one or more network flows by decomposing one or more virtual security appliances of a logical security architecture into security modules. The security modules are ordered into a sequence according to a selected workflow pattern that may be, for example, a workflow pattern that has been predefined according to known best practices. The sequence is then divided into segments, and the segments are assigned to different groups of network nodes in a network. For each segment, an assignment of each security module in the segment to a network node within the group to which the segment is assigned is computed. The network is then configured according to the assignments. To compute which network node a security module in the segment is assigned to, the cost of executing each security module on each network node in the group may be modeled, and each security module in the segment may be assigned according to a cost function and the cost model. The security modules, generally, require fewer computing resources to execute than their corresponding virtual security appliances, and implement a relatively narrower aspect of the overall security solution for the network flow.

Exemplary embodiments of the disclosure comprise methods for providing security for one or more network flows. One exemplary method comprises receiving a logical security architecture comprising at least one virtual security appliance, and decomposing the at least one virtual security appliance into security modules. The method further comprises ordering the security modules into a sequence according to a selected workflow pattern, and dividing the sequence of security modules into segments. The method further comprises assigning the segments to different groups of network nodes in a network, each group comprising one or more network nodes. The method further comprises computing, for each segment, an assignment of each security module in the segment to a network node within the group to which the segment is assigned, and configuring the network according to the assignments.

In some embodiments, assigning the segments to different groups of network nodes in the network is based, at least in part, on a topology of the network.

In some embodiments, dividing the sequence of security modules into segments is based, at least in part, on a preferred proximity of each security module in the sequence to a source or destination endpoint of a network flow.

In some embodiments, dividing the sequence of security modules into segments is based, at least in part, on a resource cost associated with executing each security module in the sequence.

In some embodiments, assigning the segments to different groups of network nodes in the network is based, at least in part, on the cost of traversing one or more links between network nodes.

In some embodiments, the method further comprises selecting the selected workflow pattern from a database of predefined workflow patterns according to security requirements for the network flow.

In some embodiments, the method further comprises modeling, for each segment, a resource cost of executing the security modules of the segment on one or more network nodes to which the segment is assigned, and computing the assignment of each security module is based, at least in part, on a result of a cost function applied to the resource costs of the security modules in the segments.

In some embodiments, configuring the network according to the assignments comprises transmitting the assignments to a traffic control node of the network. In an embodiment, transmitting the assignments to the traffic control node of the network comprises transmitting the assignments to a Software Defined Network controller.

Other embodiments comprise a security deployment node for providing security for one or more network flows. The security deployment node comprises processing circuitry, network interface circuitry, and input circuitry. The processing circuitry is communicatively coupled to the input circuitry and the network interface circuitry. The network interface circuitry is configured to communicate with one or more network nodes of a network. The input circuitry is configured to receive a logical security architecture comprising at least one virtual security appliance. The processing circuitry is configured to decompose the at least one virtual security appliance into security modules, order the security modules into a sequence according to a selected workflow pattern, divide the sequence of security modules into segments, and assign the segments to different groups of network nodes in a network, each group comprising one or more network nodes. The processing circuitry is further configured to compute, for each segment, an assignment of each security module in the segment to a network node within the group to which the segment is assigned, and configure the network according to the assignments via the network interface circuitry.

In some embodiments, the processing circuitry is configured to assign the segments to different groups of network nodes in the network based, at least in part, on a topology of the network.

In some embodiments, the processing circuitry is configured to divide the sequence of security modules into segments based, at least in part, on a preferred proximity of each security module in the sequence to a source or destination endpoint of a network flow.

In some embodiments, the processing circuitry is configured to divide the sequence of security modules into segments based, at least in part, on a resource cost associated with executing each security module in the sequence.

In some embodiments, the processing circuitry is configured to assign the segments to different groups of network nodes in the network based, at least in part, on the cost of traversing one or more links between network nodes.

In some embodiments, the processing circuitry is further configured to select the selected workflow pattern from a database of predefined workflow patterns according to security requirements for a network flow.

In some embodiments, the processing circuitry is further configured to model, for each segment, a resource cost of executing the security modules of the segment on one or more network nodes to which the segment is assigned. The processing circuitry is also configured to compute the assignment of each security module based, at least in part, on a result of a cost function applied to the resource costs of the security modules in the segments.

In some embodiments, to configure the network according to the assignments via the network interface circuitry, the network interface circuitry is configured to transmit the assignments to a traffic control node of the network. In an embodiment, to transmit the assignments to the traffic control node of the network, the network interface circuitry is configured to transmit the assignments to a Software Defined Network controller.

Other embodiments comprise a computer program product stored in a non-transitory computer readable medium for controlling a programmable user device. The computer program product comprises software instructions that, when executed on the programmable user device, cause the programmable user device to perform the various methods described above.

Other embodiments comprise a security deployment node comprising a receiving module, a decomposing module, an ordering module, a dividing module, an assigning module, a computing module, and a configuring module. The receiving module is configured to receive a logical security architecture comprising at least one virtual security appliance. The decomposing module configured to decompose the at least one virtual security appliance into security modules. The ordering module is configured to order the security modules into a sequence according to a selected workflow pattern. The dividing module is configured to divide the sequence of security modules into segments. The assigning module is configured to assign the segments to different groups of network nodes in a network, each group comprising one or more network nodes. The computing module is configured to compute, for each segment, an assignment of each security module in the segment to a network node within the group to which the segment is assigned. The configuring module is configured to configure the network according to the assignments.

In some embodiments, the assigning module is configured to assign the segments to different groups of network nodes in the network based, at least in part, on a topology of the network.

In some embodiments, the dividing module is configured to divide the sequence of security modules into segments based, at least in part, on a preferred proximity of each security module in the sequence to a source or destination endpoint of a network flow.

In some embodiments, the dividing module is configured to divide the sequence of security modules into segments based, at least in part, on a resource cost associated with executing each security module in the sequence.

In some embodiments, the assigning module is configured to assign the segments to different groups of network nodes in the network based, at least in part, on the cost of traversing one or more links between network nodes.

In some embodiments, the ordering module is further configured to select the selected workflow pattern from a database of predefined workflow patterns according to security requirements for a network flow.

In some embodiments, the computing module is further configured to model, for each segment, a resource cost of executing the security modules of the segment on one or more network nodes to which the segment is assigned. Further, the computing module is configured to compute the assignment of each security module based, at least in part, on a result of a cost function applied to the resource costs of the security modules in the segments.

In some embodiments, to configure the network according to the assignments, the configuring module is configured to transmit the assignments to a traffic control node of the network. In one embodiment, to transmit the assignments to the traffic control node of the network, the configuring module is configured to transmit the assignments to a Software Defined Network controller.

The various aspects of the various embodiments may be used alone or in any combination, as desired.

BRIEF DESCRIPTION OF THE DRAWINGS

FIG. 5 illustrates an example network topology and cost model according to embodiments of the present disclosure.

DETAILED DESCRIPTION

Figure 1:
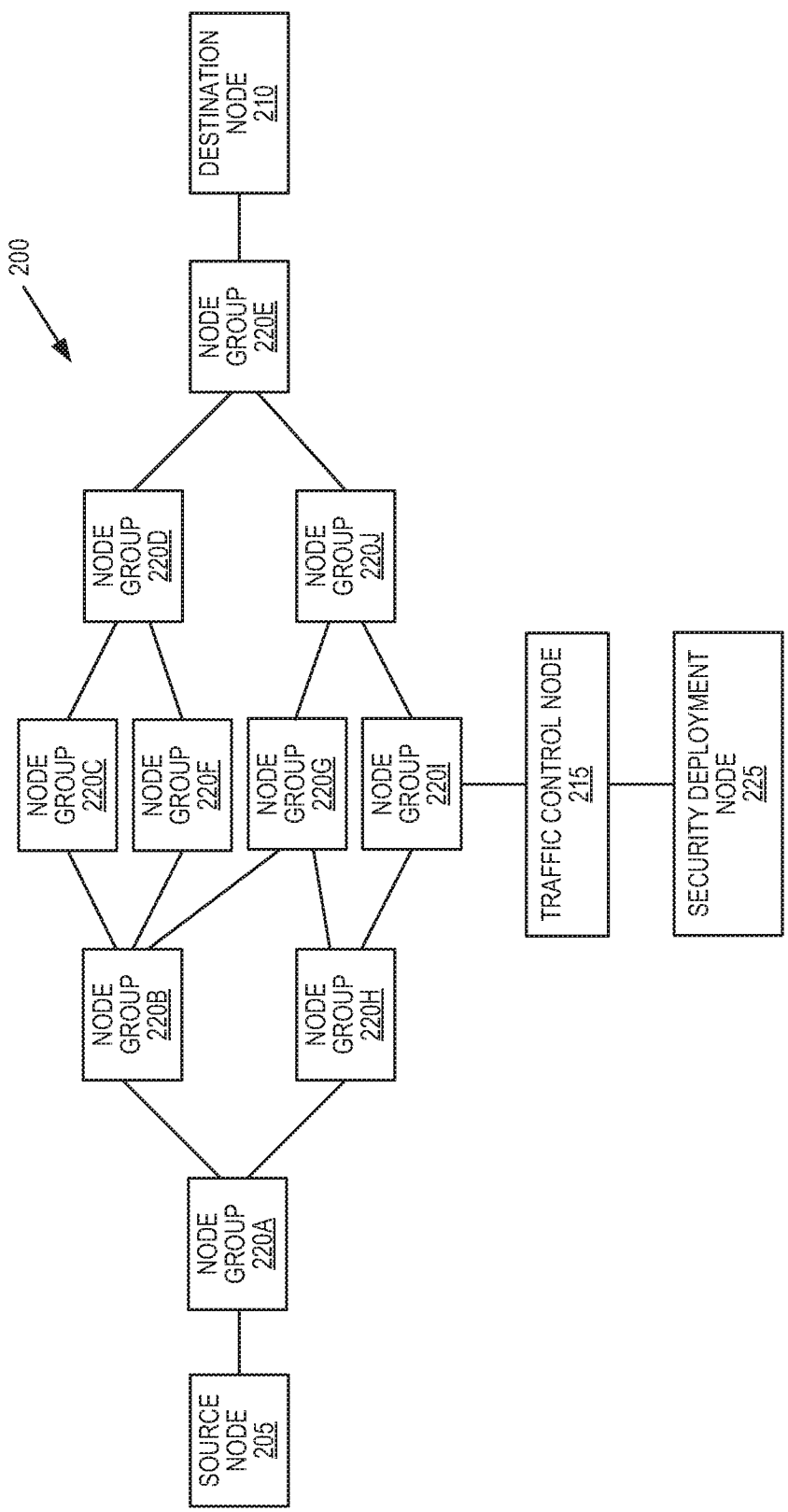
FIG. 1 illustrates an exemplary network according to embodiments of the present disclosure.

Embodiments of the present disclosure generally relate to providing security for one or more network flows. FIG. 1 illustrates an exemplary network 200 according to embodiments. The network 200 comprises a source node 205 and a destination node 210 that correspond to a network flow. The network 200 also comprises node groups 220a-j, each of which comprises one or more network nodes (not illustrated in FIG. 1) that are usable for forwarding data traffic from source node 205 toward destination node 210. According to embodiments, one or more node groups 220 and/or network nodes are considered to be part of the core of the network 200. According to embodiments, the network 200 is a cloud-based network. In addition, the network flow corresponding to the source 205 and destination nodes 210 may be either unidirectional or bidirectional. The network nodes within node groups 220a-j forward traffic under the control of a traffic control node 215, such as an SDN controller that programmatically instructs the network nodes to steer traffic. A security deployment node 225 communicates with the traffic control node 215 in order to ensure that flows are provided security through the network 200. According to various embodiments, the traffic control node 215 and the security deployment node 225 may be implemented on the same physical hardware platform, or on different physical hardware platforms.

Figure 2:
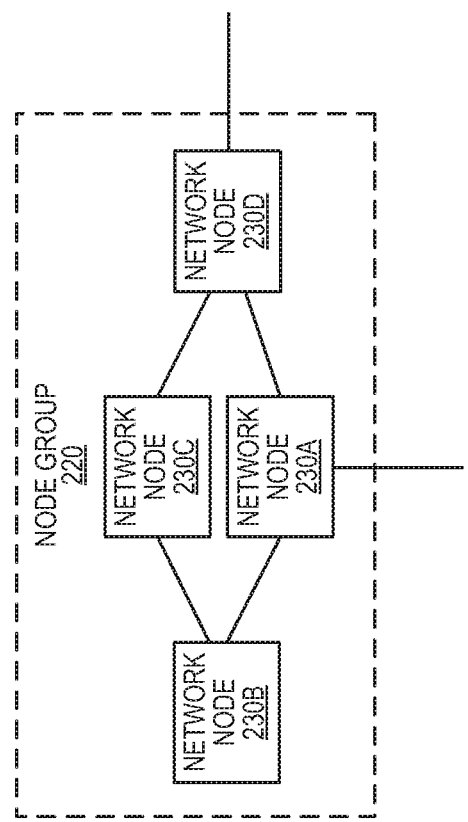
FIG. 2 illustrates an exemplary node group, according to embodiments.

FIG. 2 illustrates an example node group 220 comprising four network nodes 230a-d. Other embodiments of node group 220 may include one or more network nodes 230, connected to each other in any suitable networking configuration (e.g., fully-meshed, linear, ring). Each network node 230 comprises physical computing and networking resources (e.g., processor time, bandwidth), and may be, for example, a physical server or switch. According to embodiments, the network node 230 is a physical server executing switching software acting as a virtual switch. In the example node group 220, network nodes 230a and 230d comprise a networking connection to other nodes in the network 200, and each is able to steer flow traffic to the other network nodes 230 within the group 220, for example, under the control of the traffic control node 215. Other configurations by which a group 220 of network nodes 230 may be interconnected with each other, and/or connected to the remainder of the network 200, are also possible, according to embodiments.

Figure 3:
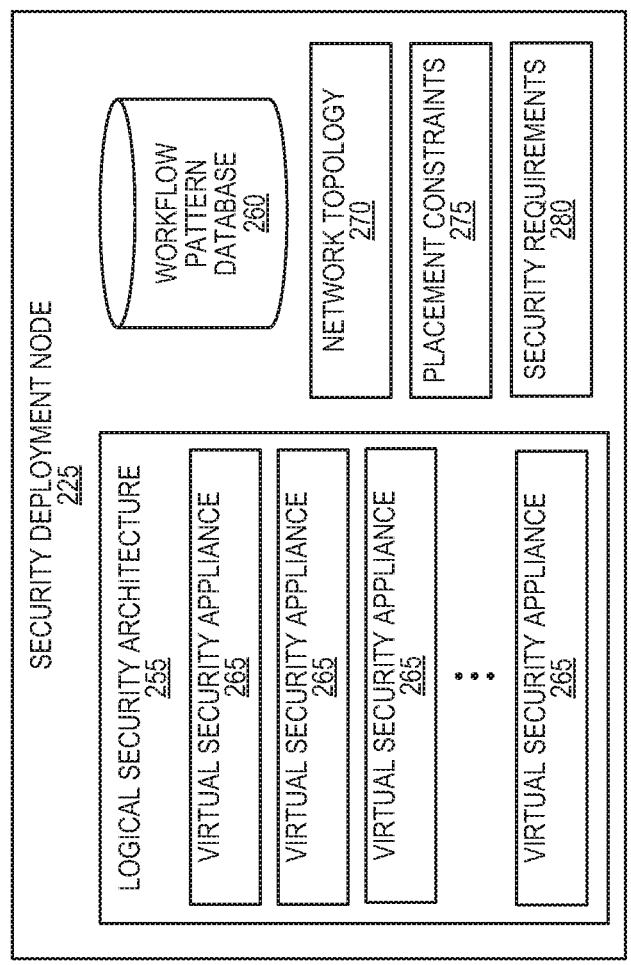
FIG. 3 illustrates a logical representation of a security deployment node according to embodiments of the present disclosure.

FIG. 3 illustrates an example of security deployment node 225 in greater detail. The security deployment node 225 comprises a logical security architecture 255, a workflow pattern database 260, a network topology 270 a cost model 275, and security requirements 280.

The workflow pattern database 260 stores one or more workflow patterns. Each workflow pattern defines a sequence of security functions to be performed for a network flow. Each sequence of security functions may, for example, be performed to provide security for traffic flowing from source node 205 to destination node 210. Similarly, each sequence may be performed in the reverse to provide security for traffic flowing from destination node 210 to source node 205. According to embodiments, the particular workflow patterns stored in the workflow pattern database 260 may be predefined according to known best practices for providing network flow security between two endpoints of a network flow, in either direction, or in both directions. The workflow patterns may also be provided, or supplemented, by the user of the security deployment node 225, according to embodiments. The workflow patterns may also, according to embodiments, be generated by one or more network analytics and/or artificial intelligence algorithms.

Figure 4:
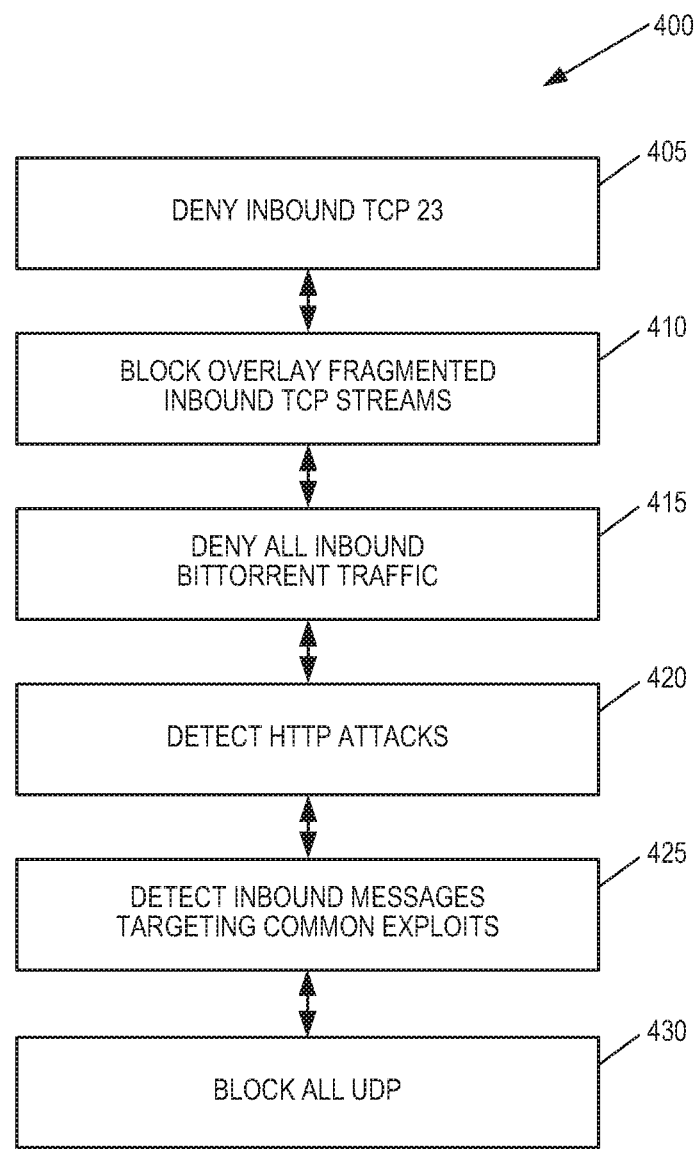
FIG. 4 illustrates an example workflow pattern according to embodiments of the present disclosure.

FIG. 4 illustrates an example workflow pattern 400 as may be defined and stored within the workflow pattern database 260. The workflow pattern 400 includes first performing layer 3 firewall processing by denying all inbound TCP traffic on port 23 (block 405). Next, the workflow pattern 400 includes performing Distributed Denial of Service protection by detecting and blocking overly fragmented inbound streams of TCP packets (block 410). Next, the workflow pattern 400 includes performing layer 7 firewall processing by blocking all inbound Bit Torrent traffic (block 415). Next, the workflow pattern 400 includes performing intrusion detection by scanning for HTTP attacks (e.g., an excessive number of inbound HTTP GET requests, a batch of computationally expensive HTTP POST requests) (block 420). Next, the workflow pattern 400 includes inbound scan detection for messages targeting commonly exploited services or ports (block 425). Next, the workflow pattern 400 includes further layer 3 firewall processing by blocking all UDP traffic (block 430). As described previously, this workflow pattern 400 may be used to provide security for a network flow between source node 205 and destination node 210 in either direction, and the reverse of workflow pattern 400 (i.e., beginning at block 430 and ending at block 405) may provide security for traffic flowing in the reverse direction. Further, one or more of the individual security functions may be applied exclusively to traffic in one of the directions, or may be applied to traffic in either direction, according to embodiments.

Returning to FIG. 3, the logical security architecture 255 of the security deployment node 225 describes the functional capabilities of the network 200, and comprises at least one virtual security appliance 265. The virtual security appliances 265 implement various general security functions, including one or more of the functions represented by one or more workflow patterns stored in the workflow pattern database 260. For example, a virtual security appliance 265, according to embodiments, may comprise a workload for a firewall that is able to deny inbound TCP packets on port 23 (block 405) and block all UDP traffic (block 430), as required by workflow pattern 400 of FIG. 4. This firewall workload may, for example, be executable as a virtual machine within a hypervisor. Other examples of virtual security appliances include, but are not limited to, workloads for Virtual Private Network (VPN) termination points, IDSs, and IPSs. According to embodiments, the logical security architecture 255 is provided by a user of the security deployment node 225 and stored in a memory of the security deployment node 225 in a machine-readable format. The at least one virtual security appliance 265 is included in the logical security architecture 255, according to embodiments, by supplying an identifier of the appropriate workload, or by including a reference to a location where a software package for performing the workload is stored (e.g., using a Uniform Resource Locator (URL)).

The security requirements 280 of the security deployment node 225 include the security needs of one or more flows in the network 200. For example, the security requirements 280 may indicate that a particular flow between source node 205 and destination node 210 requires a VPN with a minimum of 256-bit encryption. The security requirements 280 may, according to embodiments, be provided by a user of the security deployment node 225.

The network topology 270 comprises information about the network nodes 220 in the network 200. For example, as shown in FIG. 5, network topology 270 may comprise the available computing resources on each network node 230, which network nodes 230 are connected to each other, which network nodes 230 are in which node groups 220, and a delay for traversing the links between network nodes 230. In the example network topology 270 of FIG. 5, the network node NN1 has 3000 MB of memory available for performing security functions. Similarly, NN2, NN3, and NN4 have 1000 MB, 500 MB, and 150 MB of memory available for performing security functions, respectively. NN1 is connected to NN2, and the link enjoys a 10 ms delay. Similarly, NN2 is connected to NN3 with a 20 ms delay, NN2 is connected to NN4 with a 40 ms delay, and NN3 is connected to NN 5 with a 25 ms delay. The network topology 270 may, according to embodiments be, received by the security deployment node 225 from a local user, a remote user, or locally generated. To locally generate the network topology, the security deployment node 225 may, according to embodiments, use Neighbor Discovery Protocol (NDP) to discover the network nodes 230, and perform a traceroute function to determine the latency between network hops. According to embodiments, some or all of the network topology 270 is preconfigured. According to embodiments, some or all of the network topology 270 changes dynamically according to network conditions including, but not limited to, computing and/or network load on one or more network nodes 230 of the network 200. Further, according to embodiments, resources may be described on a per-node 230 basis, on a per-group 220 basis, or on both a per-node 230 and a per-group 220 basis.

The cost model 275 comprises a resource cost for executing particular security functions on particular network nodes 230. In the example depicted in FIG. 5, the individual functions of a workflow pattern are enumerated and mapped to various network nodes 230. A resource requirement is then associated with each mapping. For example, SM1 may identify the layer 3 firewall security function of blocking inbound TCP packets on port 23 (block 405) as required by workflow pattern 400. The security deployment node 225, knowing some detail about the computing resources of NN1 from the network topology 270, may model the resource cost of executing security functions on one or more network nodes. Such modeling may include simulating, estimating, computing, or predicting the computing/network resources that would be required in order for network node 230 NN1 to perform function SM1. In this way, the cost model 275 can be populated based on the network topology 270, one or more workflow patterns in the workflow pattern database 260, and/or by decomposing the general functions of the various virtual security appliances 265 of the logical security architecture 255. According to the example depicted in FIG. 5, the cost model 275 indicates that executing SM1 on NN1 will require 1500 MB of memory, whereas executing SM1 on NN2 will require 1750 MB of memory. According to embodiments, the security deployment node 225 receives some or all of the cost model 275 as input from a local or remote user of the security deployment node 225. According to other embodiments, the security deployment node 225 generates some or all of the cost model 275 after assigning the decomposed functions of the various virtual security appliances 265 to particular node groups 220, as will be described in greater detail below.

To provide security to a network flow, the security deployment node 225 configures the network 200 by assigning particular security functions of the virtual security appliances 265 to network nodes 230. To do this, the security deployment node 225 decomposes at least one virtual security appliance 265 into security modules 310. According to embodiments, the logical security architecture 255 describes one or more ways in which one or more virtual security appliances 265 may be decomposed into these security modules 310, such that the security deployment node 225 may use this information in performing the decomposition. According to embodiments, security deployment node 225 may decompose the at least one virtual security appliance 265 into security modules 310 that are configured to operate on traffic originating from the source node 205, from the destination node 210, or from either the source 205 or destination node 210.

Figure 6:
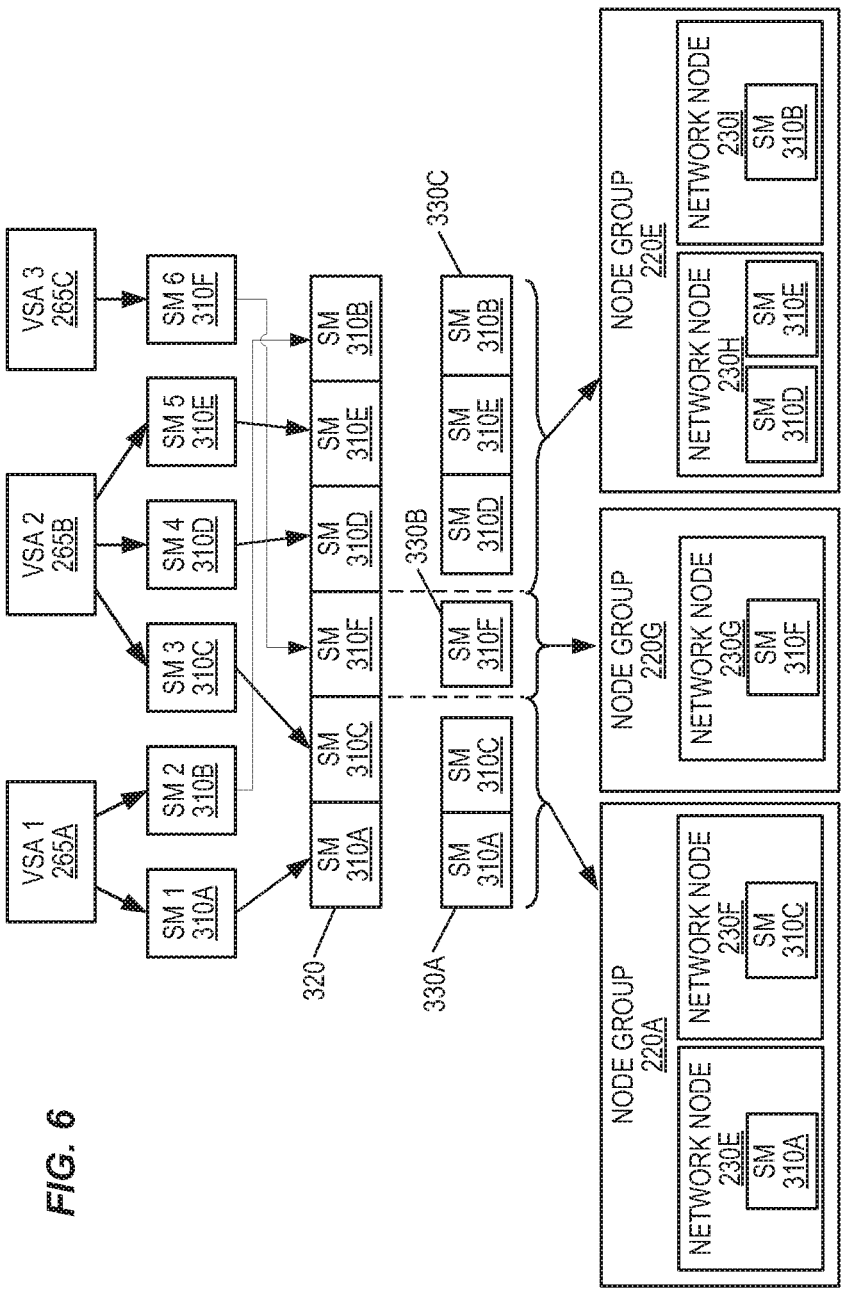
FIG. 6 illustrates an example security deployment process for a network flow according to embodiments of the present disclosure.

After the security deployment node 225 has decomposed at least one virtual security appliance 265 into security modules 310, the security deployment node 225 selects a workflow pattern (e.g., the workflow pattern 400 depicted in FIG. 4) from the workflow pattern database 260 that defines the security to be provided for the flow and is supported by the security modules 310. In the example of FIG. 6, virtual security appliance 265a implements layer 3 firewall functions, and is decomposed into security modules 310a, 310b. Security module 310a is configured to deny inbound TCP traffic on port 23 (e.g., as depicted in FIG. 4 by block 405). Security module 310b is configured to block all UDP traffic (e.g., as depicted in FIG. 4 by block 430). Virtual security appliance 265b implements an Intrusion Detection and Prevention System (IDPS) and is decomposed into security modules 310c, 310d, 310e. Security module 310c is configured to block overly fragmented inbound TCP streams (e.g., as depicted in FIG. 4 by block 410). Security module 310d is configured to detect HTTP attacks (e.g., as depicted in FIG. 4 by block 420). Security module 310e is configured to detect inbound messages targeting common exploits (e.g., as depicted in FIG. 4 by block 425). Virtual security appliance 265c implements an application layer firewall, and is decomposed into security module 310f. Security module 310f is configured to deny all inbound BitTorrent traffic (e.g., as depicted in FIG. 4 by block 415).

Having decomposed the virtual security appliances 265a-c into security modules 310a-f, the security deployment node 225 then orders the security modules 310a-f into a sequence 320 that implements the selected workflow pattern 400. As previously discussed, security modules 310 may be used to implement security functions for traffic flowing in either direction between source node 205 and destination node 210. Thus, although the selected workflow pattern 400 as described above begins at block 405 and terminates at block 430, the security modules 310 that implement the selected workflow pattern 400 may operate in reverse order on traffic flowing in the opposite direction.

It may be efficient, or otherwise advantageous, for certain security modules 310 to be deployed to the same network node 230. For example, in order to prevent easily detectable undesirable traffic from entering the core of the network 200, it may be wise to deny inbound TCP port 23 traffic (block 405), and block overly fragmented inbound TCP streams (block 410), by assigning security modules 310a, 310c to a network node 230 that is close to the source node 205 of the flow. Other security modules 310f may, for example, require substantial processing resources that are best assigned to a network node 230 having an abundant amount of computing and/or networking resources available, e.g., a high-powered and under-utilized server within the core of the network 200. Yet other security modules 310d, 310e, 310b may, for example, implement security policies that are relevant only to the destination node 210, and are therefore ideal to implement at a network node 230 that is adjacent to the destination node 210. For example, in order to block malicious UDP traffic originating from the destination node 210 from entering the core of the network 200, security module 310b (which is configured to block all UDP traffic) may be assigned to a network node 230 that is close to the destination node 210 of the flow. The security deployment node 225, according to embodiments, takes these placement considerations into account and, in view of the network topology 270, the selected workflow pattern 400, and the result of a cost function that controls the utilization of compute resources on the network 200, divides the sequence 320 of security modules 310 into the segments 330a-c which are subsequently assigned to respective node groups 220 in the network 200. The logical security architecture 255 also describes, according to embodiments, one or more ways in which the sequence 320 of security modules 310 may or may not be segmented, such that the security deployment node 225 may also use this information in performing the segmenting. In the example of FIG. 6, segment 330a includes the security modules 310a, 310c that perform functions which are advantageously performed close to source node 205. Accordingly, segment 330a is assigned to node group 220a, which is close to source node 205. Segment 330b includes a security module 310f that perform functions which are advantageously performed in the core of the network 200. Accordingly, segment 330b is assigned to node group 220g, which is in the core of the network 200. Segment 330c includes the security modules 310d, 310e, 310b that perform functions which are advantageously performed close to the destination node 210. Accordingly, segment 330c is assigned to node group 220e, which is close to destination node 210.

After each segment 230 is assigned to a different node group 220, the security deployment node 225 computes, for each segment 330, an assignment of each security module 310 in the segment 330 to a network node 230 within the group 220 to which the segment 330 is assigned. According to the example of FIG. 6, security modules 310a, 310c are assigned to network nodes 230e, 230f, respectively, each of which is within node group 220a. Similarly, security module 310f is assigned to network node 230g, which is within node group 220g. Further, security modules 310d, 310e are both assigned to network node 230h, while security module 310b is assigned to network node 230i. Both of network nodes 230h, 230i are within node group 220e.

To determine security module 310 assignments, the security deployment node 235 may, according to embodiments, make use of the cost model 275. As previously discussed, the security deployment node 225 may model the resource cost of executing various security functions on one or more network nodes 230. Thus, once segments 330 have been assigned to node groups 220, the security deployment node 225 may model a resource cost of executing the security modules 310 in a segment 330 on one or more network nodes 230 within the group 220 to which the segment 330 is assigned. According to embodiments, modeling is limited to evaluating the execution of security modules 310 on network nodes 230 within the group 220 to which the respective segment 330 is assigned in order to limit the combinations of security modules 310 and network nodes 230 that must be assessed. Such limiting may be performed, for example, to keep the computational complexity of the modeling solution from being overly expensive (as compared to a brute force modeling of each security module 310 executing on each network node 230 in each node group 220 in the network 200) or to prevent the size of the cost model 275 from exploding. The security deployment node 225 may populate the cost model 275 with the results of this modeling, and make reference to the cost model 275 in computing the assignments of the security modules 310 of each segment 320. Thus, according to embodiments, the security deployment node 225 assigns the security modules 310 of each segment 320 according to the node group 220 assignments and the cost model 275 in order to minimize the total costs associated with executing the security modules 310 on the network nodes 220, and to minimize costs associated with transmitting traffic along the path from the source node 205 to the destination node 210. After the security deployment node 235 has computed the security module 310 assignments, the security deployment node 225 configures the network 200 according to the assignments.

According to embodiments, to configure the network 200 according to the assignments, the security deployment node 225 may communicate the security module 310 assignments to the traffic control node 215 and/or deploy the security modules 310 to their assigned network nodes 230. The traffic control node 215, having received the security module 310 assignments for the network flow, can then instruct, program, or otherwise communicate with the various network nodes 230 in order to steer traffic for the flow to the network nodes 230e-i having been assigned security modules 310. As previously discussed, the security deployment node 225 may, according to embodiments, perform some or all of the functions of traffic control node 215.

Figure 7A:
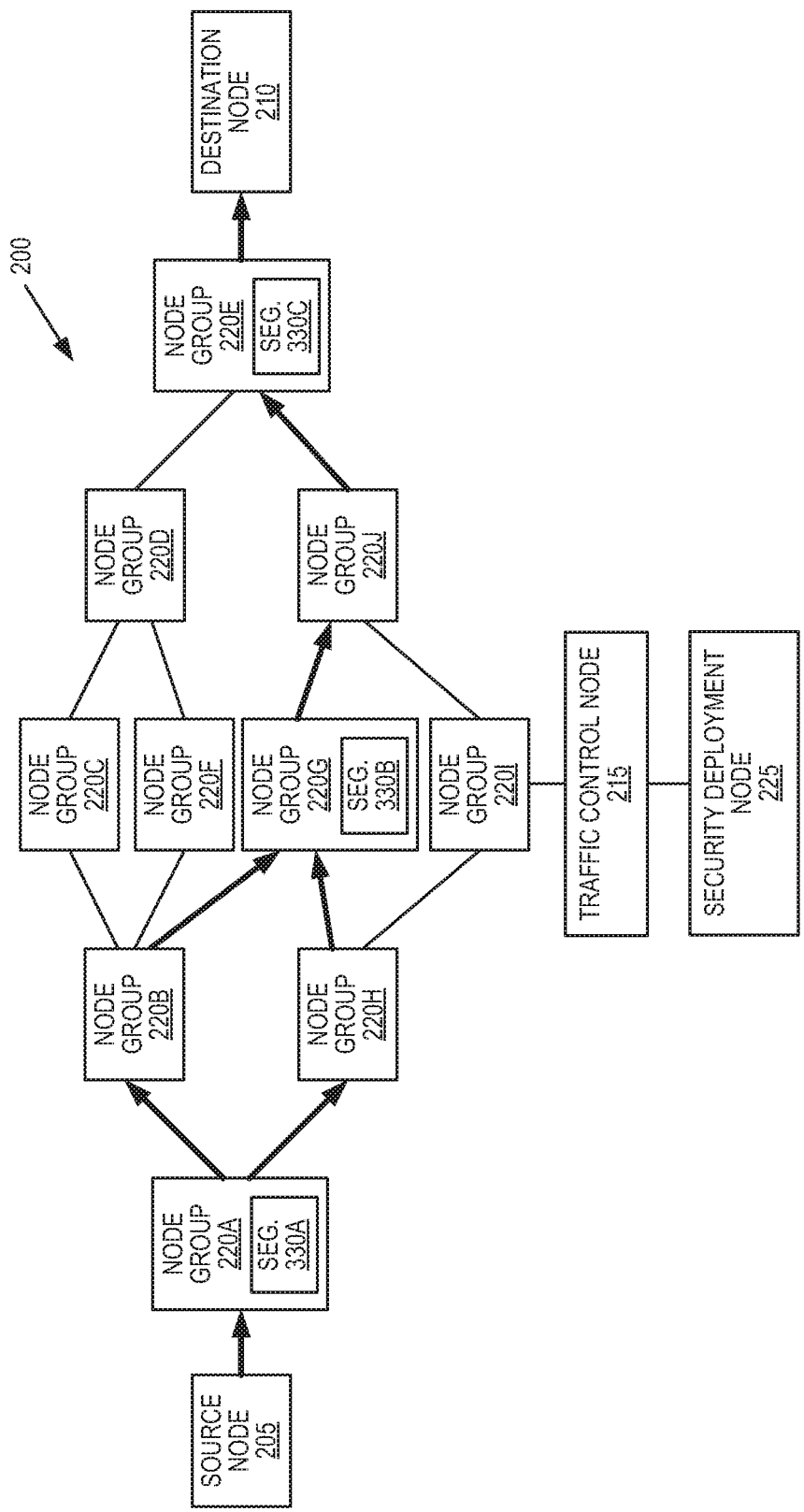
FIGS. 7A-7B illustrate exemplary configurations of the network according to embodiments of the present disclosure.

FIG. 7A depicts the result of configuring the network 200 according to the example of FIG. 6. Segment 330a is assigned to node group 220a and receives data traffic for the flow from source node 205. Network nodes 230e, 230f (not depicted in FIG. 7A) within node group 220a then apply the security modules 310a, 310c in segment 330a, in order to perform steps 405, 410 in the selected workflow 400. From node group 220a, data traffic for the flow may be steered to either or both of node groups 220b, 220h, each of which forwards their respective flow traffic through their respective network nodes 230 to node group 220g. Network node 230g (not depicted in FIG. 7A) within node group 220g applies security module 310f in segment 330b, in order to perform step 415 in the selected workflow 400. From node group 220g, data traffic for the flow may be steered to node group 220j, and on to node group 220e. Network nodes 230h, 230i within node group 220e then apply security modules 310d, 310e, 310b in segment 330c in order to perform steps 420, 425, 430 in the selected workflow 400. From node group 220e, data traffic for the flow may be steered to destination node 210.

Figure 7B:
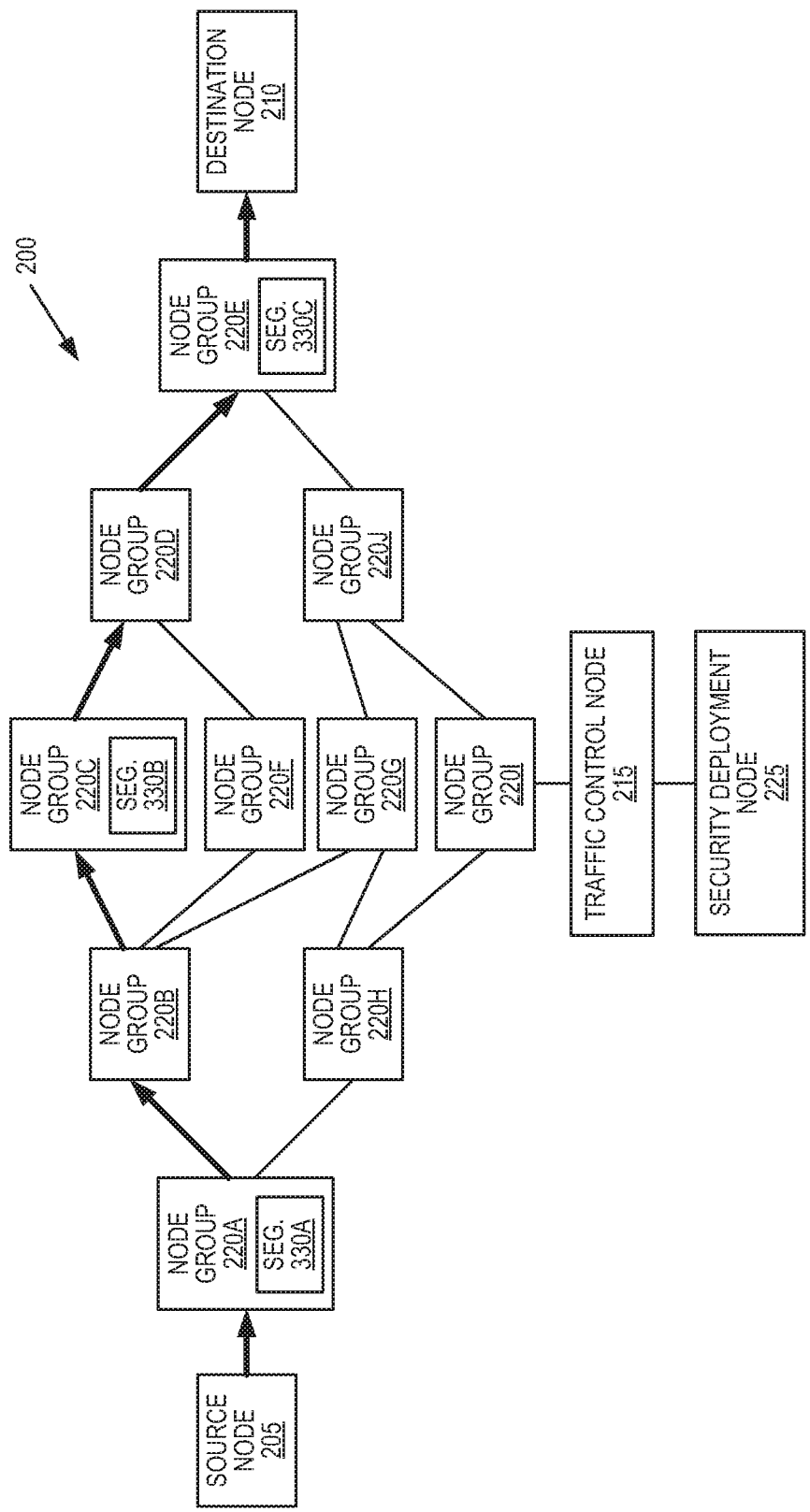

Circumstances on the network 200 may, and often do, change. Accordingly, the network nodes 230 of node group 220g may become less suitable for applying segment 330b. For example, a different node group 220c may make additional computing resources available, such that node group 220c has one or more network nodes 230 that are better suited than the network nodes 230 within node group 220g for applying segment 330b. Alternatively or additionally, the latency of the links between the network nodes 230 of node groups 220b and 220c, 220c and 220d, and/or 220d and 220e, may improve, such that directing the flow through the network nodes 230 of node group 220c would provide better flow performance than directing the flow through the network nodes 230 of node group 220g. FIG. 7B illustrates an example where it is more advantageous to have traffic for the flow steered through the network nodes of node group 220c, rather than 220g. According to embodiments, the advantageous nature of steering traffic according to FIG. 7B may be a result of shifting network conditions, applying a different cost function in generating or evaluating the cost model 275, updates to security requirements 280, changes in the network topology 270, and/or updates to the logical security architecture 255. Thus, the security deployment node 225 is able to configure the network 200 according to a wide variety of conditions, configurations, topologies, and requirements in order to provide security for a network flow in a distributed fashion within the network 200. Further, this process may be performed repeatedly to either update the security previously provided for a given network flow, or to provide security for additional network flows. Further, according to embodiments, an administrator or user of the security deployment node 225 may modify the configuration of the network 200 by updating the workflow pattern database 260, modifying (e.g., adding, removing, changing) security module(s) 310 within a sequence 320 produced by the security deployment node 225, assigning segments 330 to different network nodes 230, and/or assigning security modules 310 to different network nodes 230.

Figure 8:
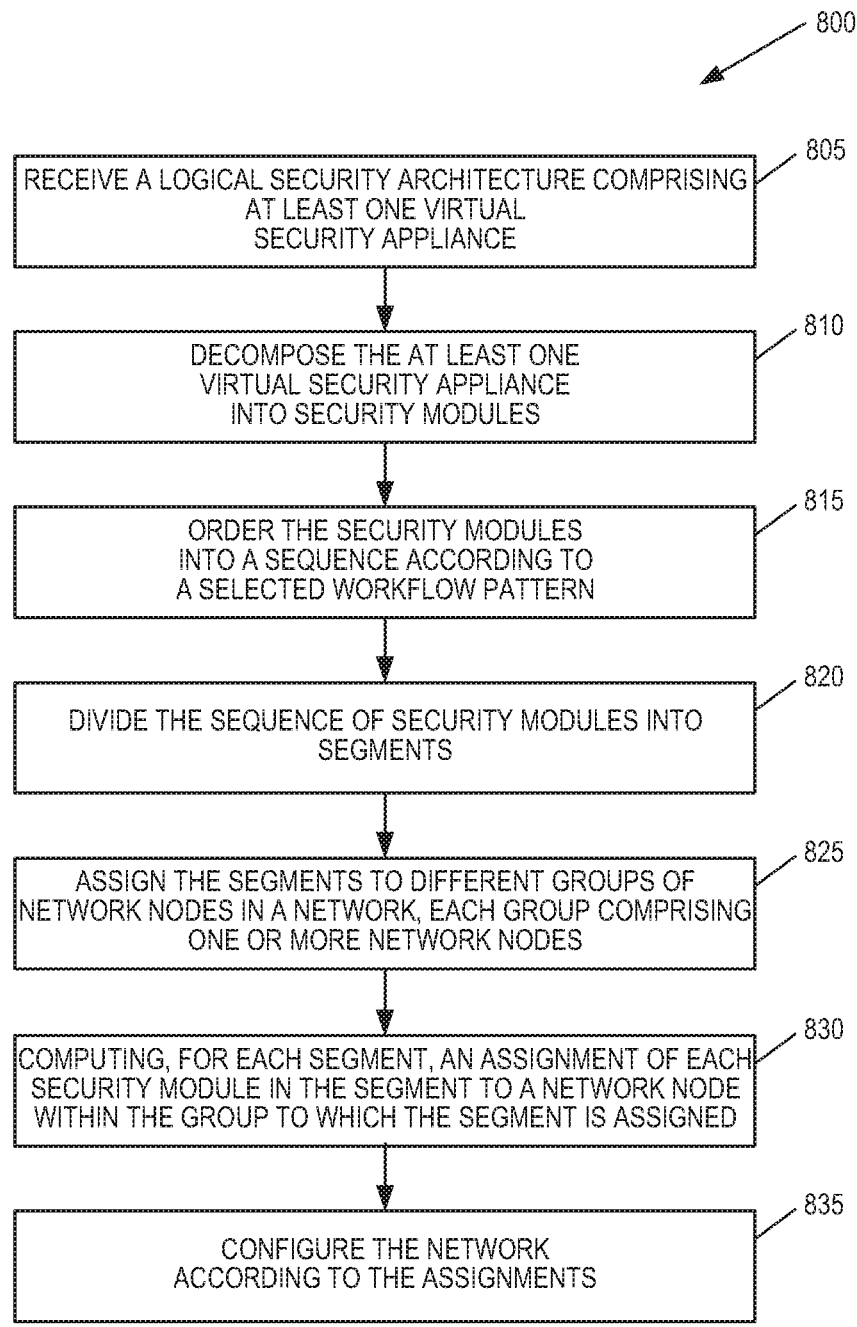
FIG. 8 illustrates an exemplary method for providing security for a network flow according to embodiments of the present disclosure.

FIG. 8 illustrates one method 800 for providing security for one or more network flows. The method 800 comprises receiving a logical security architecture 255 comprising at least one virtual security appliance 265 (block 805), and decomposing the at least one virtual security appliance 265 into security modules 310 (block 810). The method 800 further comprises ordering the security modules 310 into a sequence 320 according to a selected workflow pattern 400 (block 815), and dividing the sequence 320 of security modules 310 into segments 330 (block 820). The method 800 further comprises assigning the segments 330 to different groups 220 of network nodes 230 in a network 200, each group 220 comprising one or more network nodes 230 (block 825). The method 800 further comprises computing, for each segment 330, an assignment of each security module 310 in the segment 330 to a network node 230 within the group 220 to which the segment 330 is assigned (block 830), and configuring the network 200 according to the assignments (block 835).

Figure 9:
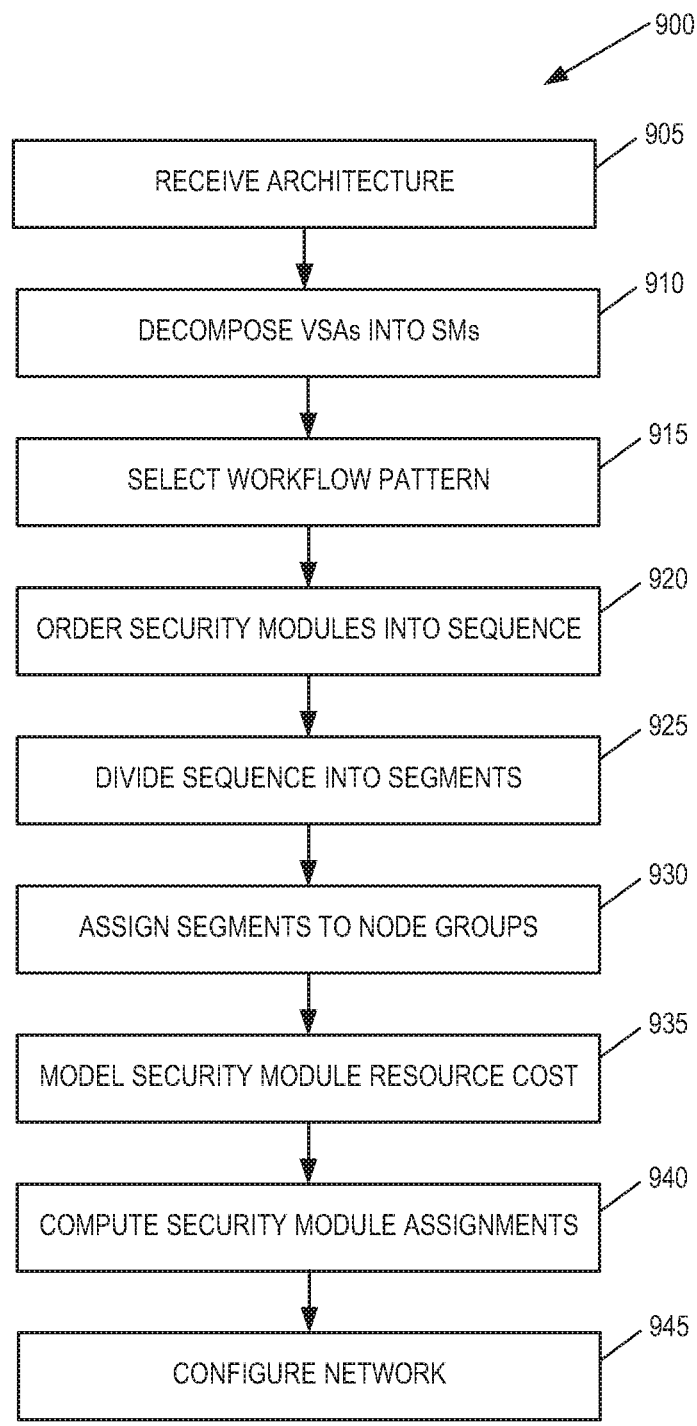
FIG. 9 illustrates a more detailed exemplary method for providing security for a network flow according to embodiments of the present disclosure.

FIG. 9 illustrates a more detailed method 900 for providing security for one or more network flows. The method 900 comprises receiving a logical security architecture 255 comprising at least one virtual security appliance 265 (block 905), decomposing the at least one virtual security appliance 265 into security modules 310 (block 910), and selecting a workflow pattern 400 from a database of predefined workflow patterns 260 according to security requirements 280 for the network flow (block 915). The method 900 also comprises ordering the security modules 310 into a sequence 320 according to the selected workflow pattern 400 (block 920) and dividing the sequence 320 of security modules 310 into segments 330 (block 925). According to embodiments, dividing the sequence 320 of security modules 310 into segments 330 is based, at least in part, on a preferred proximity of each security module 310 in the sequence 320 to a source 205 or destination endpoint 210 of a network flow. According to embodiments, dividing the sequence 320 of security modules 310 into segments 330 is based, at least in part, on a resource cost associated with executing each security module 310 in the sequence. The method 900 further comprises assigning the segments 330 to different groups 220 of network nodes 230 in a network 200, each group 220 comprising one or more network nodes 230 (block 930). According to embodiments, assigning the segments 330 to different groups 220 of network nodes 230 in the network 200 is based, at least in part, on a topology 270 of the network 200. According to embodiments, assigning the segments 330 to different groups 220 of network nodes 230 in the network 200 is based, at least in part, on the cost of traversing one or more links between network nodes 220. The method 900 further comprises modeling, for each segment 330, a resource cost of executing the security modules 310 of the segment 330 on one or more network nodes 230 to which the segment 330 is assigned (block 935). The method 900 further comprises computing, for each segment 330, an assignment of each security module 310 in the segment 330 to a network node 230 within the group 220 to which the segment 330 is assigned (block 940). According to embodiments, computing the assignment of each security module 310 is based, at least in part, on a result of a cost function applied to the resource costs of the security modules 310 in the segments 330. Finally, the method 900 comprises configuring the network 200 according to the assignments (block 945). According to embodiments, configuring the network 200 according to the assignments comprises transmitting the assignments to a traffic control node 215 (e.g., an SDN controller) of the network 200.

Figure 10:
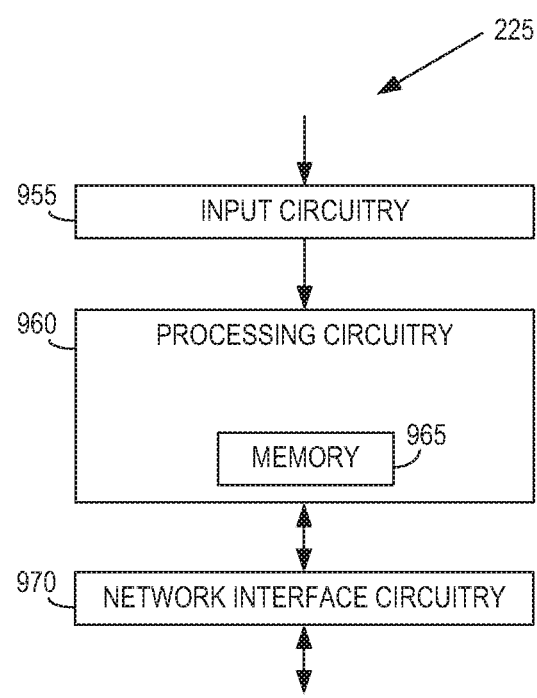
FIG. 10 illustrates exemplary hardware useful for implementing the methods described herein, according to one or more embodiments of the present disclosure.

FIG. 10 illustrates exemplary hardware of a security deployment node 225 for providing security for a network flow. The security deployment node 225 comprises processing circuitry 960 that is communicatively coupled to network interface circuitry 970 and input circuitry 955 via one or more buses. The processing circuitry 960 may comprise any sequential state machine capable of executing machine instructions stored as machine-readable computer programs in the memory 965, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. According to embodiments, the processing circuitry 960 is communicatively coupled to memory 965 via one or more buses. The memory 965 of the various embodiments may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

The network interface circuitry 970 is configured to communicate with one or more network nodes 220 of a network 200. According to various embodiments, the network interface circuitry 970 may comprise analog and/or digital transceiving circuitry capable of communicating with each other, or with other devices, according to one or more communication protocols known in the art or that may be developed, such as HTTP, RTP, RTCP, HTTPs, Ethernet, TCP/IP, ATM, or the like. The network interface circuitry 970 implements receiver and transmitter functionality appropriate to the communication network to which it is attached (e.g., optical, electrical, and the like). The transmitter and receiver functionality may share circuit components and/or software, or alternatively may be implemented separately within the network interface circuitry.

According to embodiments, the input circuitry 955 is useful to accept input signals from a user of the security deployment node 225. For example, the input circuitry 955 may be comprised within one or more of a pointing device (such as a mouse, stylus, touchpad, trackball, pointing stick, joystick), a touchscreen, a microphone for speech input, an optical sensor for optical recognition of gestures, and a keypad or keyboard. The network interface circuitry 955 may also serve as the input circuitry 955, according to embodiments, for accepting input signals from a remote user, network node 220, or other entity within the network 200.

The input circuitry 955 is configured to receive a logical security architecture 255 comprising at least one virtual security appliance 265. The processing circuitry 960 is configured to decompose the at least one virtual security appliance 265 into security modules 310 and order the security modules 310 into a sequence 320 according to a selected workflow pattern 400. The processing circuitry 960 is further configured to divide the sequence 320 of security modules 310 into segments 330 and assign the segments 330 to different groups 220 of network nodes 230 in a network 200, each group 220 comprising one or more network nodes 230. The processing circuitry 960 is further configured to configure the network 200 according to the assignments via the network interface circuitry 970.

Figure 11:
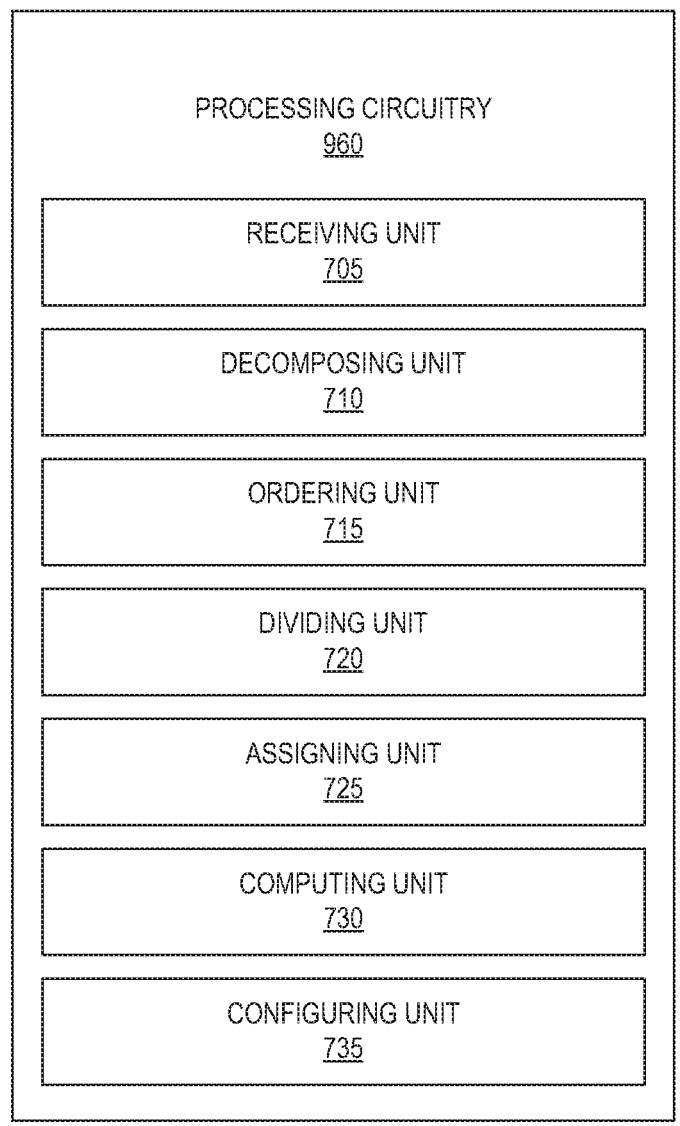
FIG. 11 illustrates processing circuitry according to embodiments of the present disclosure.

FIG. 11 illustrates an embodiment of the processing circuitry 960 comprising physical hardware units. The processing circuitry 960 comprises a receiving unit 705, a decomposing unit 710, an ordering unit 715, a dividing unit 720, an assigning unit 725, a computing unit 730, and a configuring unit 735.

The receiving unit 705 is configured to receive a logical security architecture 255 comprising at least one virtual security appliance 265. The decomposing unit 710 is configured to decompose the at least one virtual security appliance 265 into security modules 310. The ordering unit 715 is configured to order the security modules 310 into a sequence 320 according to a selected workflow pattern 400. The dividing unit 720 is configured to divide the sequence 320 of security modules 310 into segments 330. The assigning unit 725 is configured to assign the segments 330 to different groups 220 of network nodes 230 in a network 200, each group 220 comprising one or more network nodes 230. The computing unit 730 is configured to compute, for each segment 330, an assignment of each security module 310 in the segment 330 to a network node 230 within the group 220 to which the segment 330 is assigned. The configuring unit 735 is configured to configure the network 200 according to the assignments.

Figure 12:
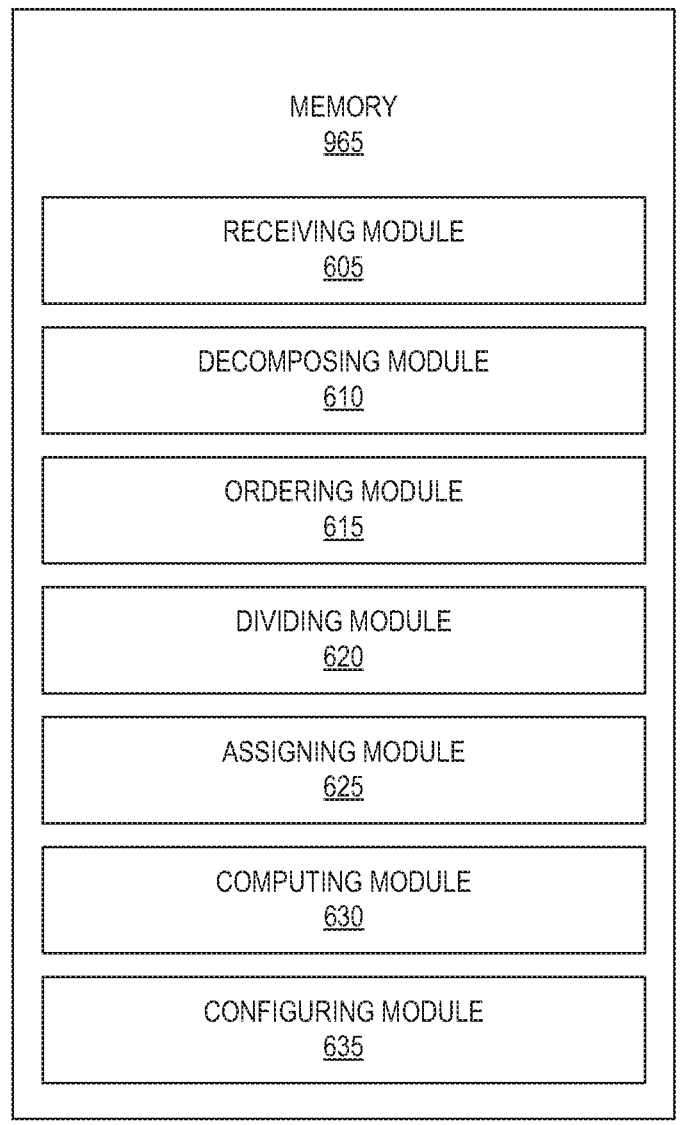
FIG. 12 illustrates memory according to embodiments of the present disclosure.

FIG. 12 illustrates the memory 965 comprising software modules for performing embodiments as discussed above. The memory 965 comprises a receiving module 605, a decomposing module 610, an ordering module 615, a dividing module 620, an assigning module 625, a computing module 630 and a configuring module 635.

The receiving module 605 is configured to receive a logical security architecture 255 comprising at least one virtual security appliance 265. The decomposing module 610 is configured to decompose the at least one virtual security appliance 265 into security modules 310. The ordering module 615 is configured to order the security modules 310 into a sequence 320 according to a selected workflow pattern 400. The dividing module 620 is configured to divide the sequence 320 of security modules 310 into segments 330. The assigning module 625 is configured to assign the segments 330 to different groups 220 of network nodes 230 in a network 200, each group 220 comprising one or more network nodes 230. The computing module 630 is configured to compute, for each segment 330, an assignment of each security module 310 in the segment 330 to a network node 230 within the group 220 to which the segment 330 is assigned. The configuring module 635 is configured to configure the network 200 according to the assignments.

Those skilled in the art will appreciate that the various methods and processes described herein may be implemented using various hardware configurations that generally, but not necessarily, include the use of one or more microprocessors, microcontrollers, digital signal processors, or the like, coupled to, or comprising, memory storing software instructions or data for carrying out the techniques described herein.

For instance, one or more of the processing functionalities discussed above may be implemented using dedicated hardware, rather than a microprocessor configured with program instructions. Such variations, and the engineering tradeoffs associated with each, will be readily appreciated by the skilled practitioner. Since the design and cost tradeoffs for the various hardware approaches, which may depend on system-level requirements that are outside the scope of the present disclosure, are well known to those of ordinary skill in the art, further details of specific hardware implementations are not provided herein.

The embodiments of the present disclosure may be carried out in other ways than those specifically set forth herein without departing from the essential characteristics of the disclosure. The present embodiments are to be considered in all respects as illustrative and not restrictive, and all changes coming within the meaning and equivalency range of the appended claims are intended to be embraced therein.

What is claimed is:

1. A method for providing security for one or more network flows, the method comprising:
   receiving a logical security architecture comprising at least one virtual security appliance;
   decomposing the at least one virtual security appliance into security modules;
   selecting a workflow pattern from a database of predefined workflow patterns according to security requirements for a network flow;
   ordering the security modules into a sequence according to the selected workflow pattern;
   dividing the sequence of security modules into segments;

assigning the segments to different groups of network nodes in a network, each group comprising one or more network nodes;

modeling, for each segment, a resource cost of executing the security modules of the segment on one or more network nodes to which the segment is assigned;

computing, for each segment, an assignment of each security module in the segment to a network node within the group to which the segment is assigned based, at least in part, on a result of a cost function applied to the resource costs of the security modules in the segment;

configuring the network according to the assignments.

2. The method of claim 1, wherein assigning the segments to different groups of network nodes in the network is based, at least in part, on a topology of the network.

3. The method of claim 1, wherein dividing the sequence of security modules into segments is based, at least in part, on a preferred proximity of each security module in the sequence to a source or destination endpoint of a network flow.

4. The method of claim 1, wherein dividing the sequence of security modules into segments is based, at least in part, on a resource cost associated with executing each security module in the sequence.

5. The method of claim 1, wherein assigning the segments to different groups of network nodes in the network is based, at least in part, on the cost of traversing one or more links between network nodes.

6. The method of claim 1, wherein configuring the network according to the assignments comprises transmitting the assignments to a traffic control node of the network.

7. The method of claim 6, wherein transmitting the assignments to the traffic control node of the network comprises transmitting the assignments to a Software Defined Network controller.

8. A security deployment node for providing security for one or more network flows, the security deployment node comprising:

network interface circuitry configured to communicate with one or more network nodes of a network;

input circuitry configured to receive a logical security architecture comprising at least one virtual security appliance;

processing circuitry, communicatively coupled to the input circuitry and the network interface circuitry, and configured to:

decompose the at least one virtual security appliance into security modules;

select a workflow pattern from a database of predefined workflow patterns according to security requirements for a network flow;

order the security modules into a sequence according to the selected workflow pattern;

divide the sequence of security modules into segments;

assign the segments to different groups of network nodes in the network, each group comprising one or more network nodes;

model, for each segment, a resource cost of executing the security modules of the segment on one or more network nodes to which the segment is assigned;

compute, for each segment, an assignment of each security module in the segment to a network node within the group to which the segment is assigned based, at least in part, on a result of a cost function applied to the resource costs of the security modules in the segment;

configure the network according to the assignments via the network interface circuitry.

9. The security deployment node of claim 8, wherein the processing circuitry is configured to assign the segments to different groups of network nodes in the network based, at least in part, on a topology of the network.

10. The security deployment node of claim 8, wherein the processing circuitry is configured to divide the sequence of security modules into segments based, at least in part, on a preferred proximity of each security module in the sequence to a source or destination endpoint of a network flow.

11. The security deployment node of claim 8, wherein the processing circuitry is configured to divide the sequence of security modules into segments based, at least in part, on a resource cost associated with executing each security module in the sequence.

12. The security deployment node of claim 8, wherein the processing circuitry is configured to assign the segments to different groups of network nodes in the network based, at least in part, on the cost of traversing one or more links between network nodes.

13. The security deployment node of claim 8, wherein the network interface circuitry is configured to transmit the assignments to a traffic control node of the network.

14. The security deployment node of claim 13, wherein, to transmit the assignments to the traffic control node of the network, the network interface circuitry is configured to transmit the assignments to a Software Defined Network controller.

15. A non-transitory computer readable recording medium storing a computer program product for controlling a programmable network entity in a network, the computer program product comprising software instructions which, when run on processing circuitry of the programmable network entity, causes the programmable network entity to:

receive a logical security architecture comprising at least one virtual security appliance;

decompose the at least one virtual security appliance into security modules;

select a workflow pattern from a database of predefined workflow patterns according to security requirements for a network flow;

order the security modules into a sequence according to a selected workflow pattern;

divide the sequence of security modules into segments;

assign the segments to different groups of network nodes in a network, each group comprising one or more network nodes;

model, for each segment, a resource cost of executing the security modules of the segment on one or more network nodes to which the segment is assigned;

compute, for each segment, an assignment of each security module in the segment to a network node within the group to which the segment is assigned based, at least in part, on a result of a cost function applied to the resource costs of the security modules in the segment;

configure the network according to the assignments.

* * * * *